United States Patent [19]
Aro

[11] 4,299,102
[45] Nov. 10, 1981

[54] LOCKING FUEL CAP WITH PLASTIC MECHANISM

[75] Inventor: Ernesto Aro, Torrance, Calif.

[73] Assignee: Orion Industries, Inc., Compton, Calif.

[21] Appl. No.: 99,538

[22] Filed: Dec. 3, 1979

[51] Int. Cl.³ ............................................. B65D 55/14
[52] U.S. Cl. ........................................ 70/165; 70/173; 220/210; 220/203; 220/204; 220/303; 220/DIG. 33
[58] Field of Search .................... 70/165, 173, 169; 220/210, DIG. 33

[56] References Cited

U.S. PATENT DOCUMENTS

| | | | |
|---|---|---|---|
| 2,003,046 | 5/1935 | Halkett | 70/165 |
| 3,893,581 | 7/1975 | Kapphahn | 70/169 X |
| 4,132,091 | 1/1979 | Aro et al. | 70/165 |
| 4,231,240 | 11/1980 | Fujita et al. | 70/173 |

FOREIGN PATENT DOCUMENTS 757683 10/1933 France .................. 70/165

Primary Examiner—Roy D. Frazier
Assistant Examiner—Carl F. Pietruszka
Attorney, Agent, or Firm—Fulwider, Patton, Rieber, Lee & Utecht

[57] ABSTRACT

A threaded cap for sealing an automotive vehicle fuel tank is provided with a unitary molded central plastic core and a bonnet rotatably mounted on the plastic core. A pair of concentric races are defined on the plastic core. The inner race carries a unitary molded plastic frame which has a pair of resilient, closely spaced transverse cantilevered arms defining a gap therebetween. The frame is also provided with a resilient catch. A unitary molded plastic bolt is reciprocally movable along the gap to engage and disengage the core for rotation with the bonnet. The bolt has two detents which coact with the catch on the frame to hold the bolt at selected unlocking and locking dispositions of movement. The bolt includes a stud which projects into the gap between the arms so that the arms spring bias the bolt toward the locking disposition. A lock mechanism is used to shift the bolt to an unlocking disposition so that the fuel cap be disengaged from the fuel tank inlet pipe. Counter-rotation of the bonnet returns the bolt to a locking position.

8 Claims, 10 Drawing Figures

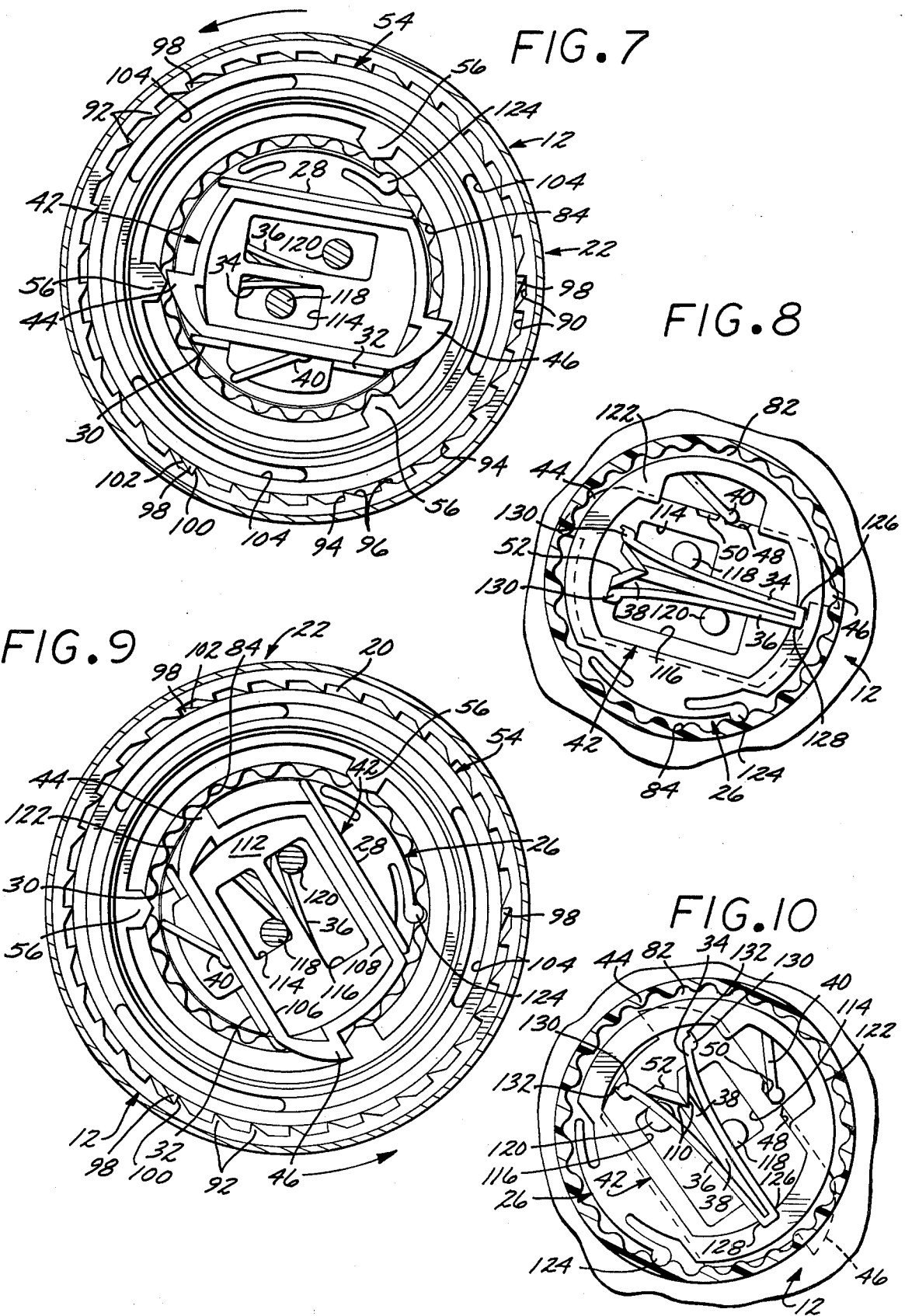

LOCKING FUEL CAP WITH PLASTIC MECHANISM

BACKGROUND OF THE INVENTION

1. Field of the Invention

The present invention relates to locking fuel tank caps.

2. Description of the Prior Art

There have been many locking fuel tank caps devised with a variety of interactive mechanisms for locking and unlocking the cap on a fuel tank inlet. However, all such devices have involved the use of inordinately complex movements and mechanisms. Such conventional devices involve a considerable number of moving parts, thereby creating a great liklihood of malfunction. In addition, conventional locking gas caps typically employ metal parts in the engaging and disengaging movements which are actuated by a lock mechanism and by manipulation of the fuel tank cap itself. Such metal parts wear inordinately against the plastic components of locking fuel tank caps, and also become corroded and deteriorate in hostile environments. Deterioration is particularly noticeable in damp climates and in salt air.

SUMMARY OF THE INVENTION

The present invention is a self-locking fuel tank cap which employs only two unitary moving parts for the engagement and disengagement of a locking mechanism in coupling and decoupling the rotation of a bonnet to an externally threaded core. A third unitary plastic moving part is preferably employed as a clutch mechanism to couple the bonnet to the core in a torque limiting fashion when the bonnet is rotated in a direction to tighten the core onto a fuel tank inlet pipe.

The core itself is formed entirely of plastic, and is a hollow, molded unitary plastic structure that is threaded externally and in which concentric inner and outer races are defined relative to a radially directed sealing lip. A unitary transverse plastic frame is rotatably supported by the inner race. This plastic frame includes a resilient detent catch and a pair of resilient, transverse closely spaced cantilivered arms. A gap is defined between the arms to extend across the axial center of the inner race. A unitary plastic bolt rides along the gap atop the frame. The bolt has lugs at both ends, each one of which is engageable when the bolt is rotated in opposite directions. The bolt has a downwardly depending wedge-shaped stud which extends into the gap between the cantilevered arms of the plastic frame. The apex of the wedge-shaped stud is directed toward the bases of attachment of the cantilevered arms to the plastic frame, so that the resiliency of the arms acts against the sides of the stud to urge the stud away from the bases of the cantilevered arms in spring biasing fashion. The bolt also has at least two detents, or recesses, for alternatively engaging the resilient catch on the plastic frame at selected unlocking and locking dispositions of movement of the bolt along the frame. Because the cantilevered arms are resiliently spread apart by the wedge-shaped stud, the arms tend to urge the stud toward their cantilevered free extremities and to carry the bolt toward the locking disposition.

A unitary, annular plastic latching ring is rotatably mounted in the outer race of the core. The latching ring has at least one radially inwardly directed tooth for engagement with the lugs of the bolt. When the bolt is appropriately shifted along the gap between the cantilevered arms in the frame, the lugs will coact with the annular latching ring to rotate the core in either a locking direction of full threaded engagement with the fuel tank inlet pipe, or an unlocking direction of disengagement. A lock mechanism is mounted at the axial center of the bonnet and includes at least one crank pin which projects into engagement with the bolt to shift the bolt from its locking to its unlocking disposition.

Preferably the annular latching ring is coupled to the core in torque limiting fashion in a direction to tighten the core onto the fuel tank inlet pipe. When the core is fully tightened, further rotation of the bonnet will rotate the bolt, the frame and the latching ring, but the latching ring will disengage from the core. An annular retaining ring secures the bonnet to the plastic core to allow relative rotational movement therebetween, but to prohibit relative axial movement.

The bolt, the latching ring, the frame and the core are all separate pieces, molded entirely of plastic. These parts constitute the entire movement which interacts with the locking mechanism and fuel cap bonnet to allow locking and unlocking disengagement with a fuel tank inlet. These parts are extremely inexpensive to manufacture and easy to assembly, compared to the more intricate, complex prior art devices presently available. They are also corrosion resistant and are assembled together in such a fashion as to be extremely wear resistant.

The invention may be described with greater clarity and particularity by reference to the accompanying drawings.

DESCRIPTION OF THE DRAWINGS

FIG. 7 is a view corresponding to FIG. 4 showing rotation of the bonnet in the direction opposite that of FIG. 4 without actuation of the locking mechanism.

FIG. 8 is a sectional detail corresponding to FIG. 6 showing the cap mechanism in the condition of FIG. 7.

FIG. 9 is a view corresponding to FIG. 4 showing rotation of the bonnet in the direction opposite that of FIG. 4 with the locking mechanism actuated.

FIG. 10 is a sectional detail corresponding to FIG. 6 showing the cap mechanism in the condition of FIG. 9.

DESCRIPTION OF THE EMBODIMENT

Figure 1:
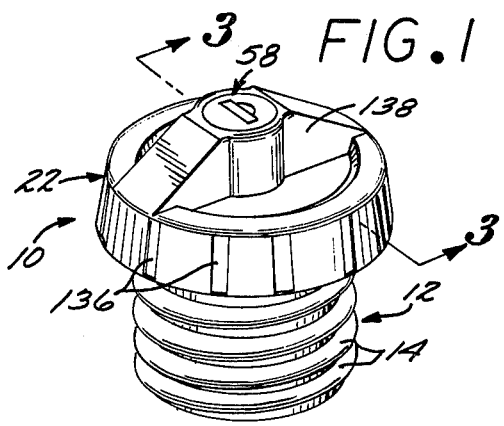
FIG. 1 is a perspective view of a locking fuel tank cap according to the invention.

FIG. 1 illustrates the fuel tank cap 10 according to the invention. The fuel tank cap 10 includes a generally drum shaped plastic core 12 and in an inverted umbrella shaped concave bonnet 22 depicted in FIG. 1. The invention includes a flat, ring-shaped frame 26 with a pair of cantilevered arms 34 and 36, depicted in FIG. 6, an oblong bolt 42 and an annular latching ring 54, depicted in FIG. 4.

Figure 3:
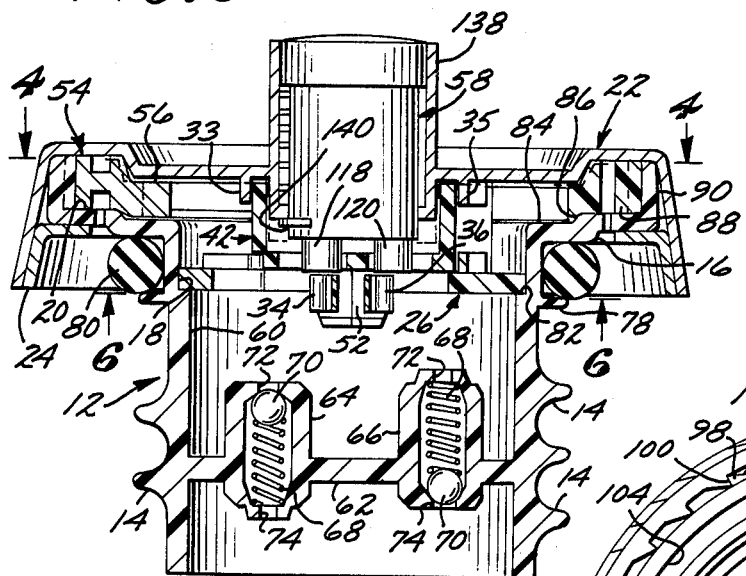
FIG. 3 is a sectional elevational view of the cap taken along the lines 3—3 of FIG. 1.

The plastic core 12 is an integrally molded structure with helical threads 14 thereon. As depicted in FIG. 3, the core 12 is molded of plastic with a radially outwardly directed sealing lip 16 which defines an inner annular race 18 and an outer annular race 20. Preferably, a lubricating grease is applied to the races 18 and 20.

The core 12 is a hollow, unitary plastic structure with a generally cylindrical wall 60 upon the exterior surface of which the integrally molded helical threads 14 are defined. Within the cylindrical wall 60 of the core 12 a transverse valve plate 62 is integrally formed. Within the valve plate 62 there are two spaced molded pressure relief valve housings 64 and 66. Within each valve housing there is a helically coiled cylindrical spring 68 which is compressed to push against a metal sphere 70.

Each of the valve housing 64 and 66 has an upper axial aperture 72 and a lower axial aperture 74. The sphere 70 of the valve housing 64 is sized to seal the upper aperture 72 while the sphere 70 of the valve housing 66 seals the lower aperture 74. Together the pressure relief valves within the valve housings 64 and 66 largely isolate the fuel tank from the environment and prevent the indiscriminate escape of fumes from the fuel in the tank. However, the pressure relief valve within the housing 64 is necessary to prevent a vacuum from forming within the fuel tank as fuel is consumed. When a pressure differential exists such that pressure external to the fuel tank is significantly greater than the pressure within, the pressure against the sphere 70 will overcome the biasing force of spring 68 within the valve housing 64 and push the sphere 70 out of the mouth of the aperture 72 in the valve housing 64 to allow pressure to equalize to within a predetermined differential controlled by the strength of the spring 68. This prevents a vacuum from forming within the fuel tank which would otherwise disrupt the flow of fuel to the carburetor of an engine.

The pressure relief valve within the housing 66 is required in order to prevent the dangerous build up of pressure within the fuel tank. Such a situation might well arise when the fuel tank is in a vehicle sitting in the sun. As the fuel and vapor in the tank are heated, they expand. Upon reaching a predetermined pressure differential, the vapor pressure within the tank will force the sphere 70 from the mouth of the aperture 74 in the valve housing 66 to allow a limited amount of vapor to escape so that the pressure differential relative to the external atmosphere falls below a maximum allowable level determined by the strength of the spring 68. Without the pressure relief provided by the valve in the housing 66 an explosive condition could develop within the fuel tank.

Figure 5:
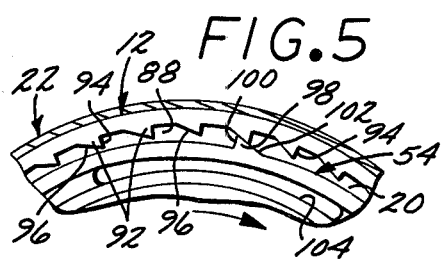
FIG. 5 is a detail of the torque limiting engagement mechanism of the cap.
Figure 4:
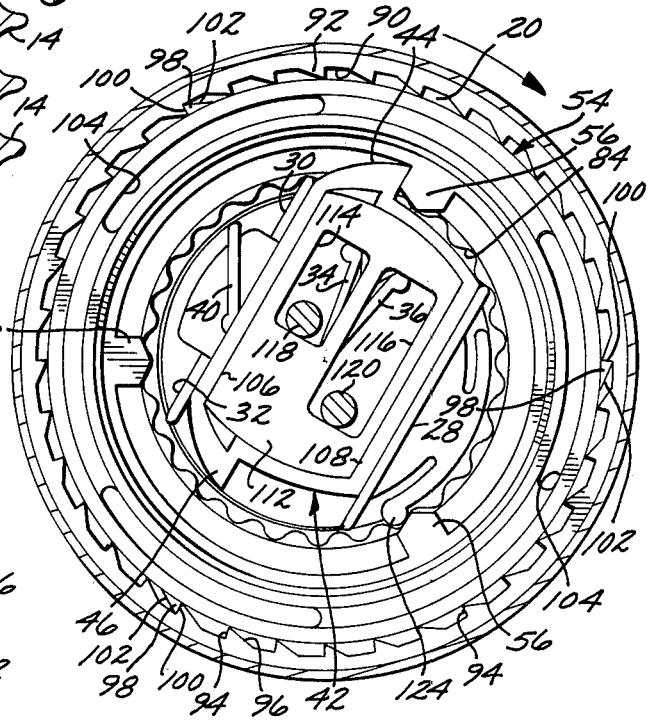
FIG. 4 is a sectional view taken along the lines 4—4 of FIG. 3 with the bolt in locking engagement.

Near the upper extremity of the wall 60 in the core 12 there is a radially outwardly directed flange 78 which, together with the underside of the lip 16, defines an annular channel adapted to hold a sealing gasket, such as the O-ring 80 depicted in FIG. 3. The inner race 18 is defined within the core 12 on the interior surface thereof, opposite this channel. The inner race 18 includes a shoulder 82 that defines a ledge atop the cylindrical wall 60. Offset from the cylindrical wall 60 radially outwardly therefrom at the shoulder 82 is an upright corrugated surface 84 that extends upwardly to the inner periphery of the outer race 20. The interior perimeter of the outer race 20 is defined by an annular floor 83 (FIG. 3) which rises in an annular beveled area 86 to a slightly elevated outer annular peripheral floor 88. The upper and outermost extremity of the lip 16 is defined by an upright annular wall 90, into the interior surface of which teeth 92 are defined. As depicted in FIGS. 4 and 5 the teeth 92 have radially directed surfaces 94, all disposed to face in the same direction of rotation. The backsides of the teeth 92 are inclined camming surfaces 96, all disposed in the opposite direction of rotation.

Figure 6:
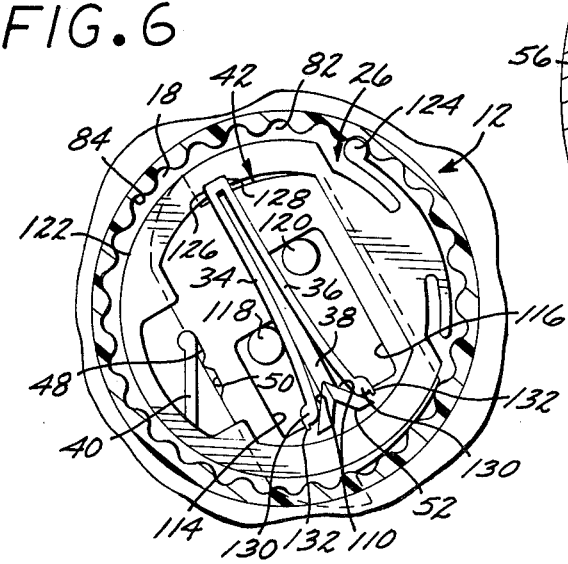
FIG. 6 is an upward sectional detail taken along the lines 6—6 of FIG. 3.

FIG. 6 depicts a unitary generally disk-shaped plastic frame 26 which is mounted for rotation in the inner race 18 of the core 12. The plastic frame 26 is equipped with parallel chordal spaced ribs 28, 30 and 32 thereatop illustrated in FIG. 4, which, together with corresponding ribs 33 and 35 on the bonnet 22, define the rails of a track. The frame 26 is constructed with an extensive arcuate perimeter 122 which extends over an obtuse circular angle. Between the extremities of the circular arcuate surface 122 a pair of inwardly directed slots are defined along a cord in the structure of the frame 26 to delineate a follower knob 124 which is held out in cantilever fashion by means of a neck from the remainder of the frame 26. The knob 124 ratchets across the corrugated surface 84 of the inner race 18 of the core 12.

The frame 26 is also constructed with a pair of resilient transverse cantilevered arms 34 and 36 which define a gap 38 therebetween that extends parallel to the path of movement of the bolt 42 through the axial center of the inner race 18, as illustrated in FIG. 6.

The cantilevered arms 34 and 36 are transversely oriented but also extend below the plane of the generally disk-shaped configuration of the frame 26, and are attached together at their respective bases 126 and 128. The cantilevered arms 34 and 36 extend from their bases 126 and 128 in slightly diverging fashion. Both of the arms 34 and 36 terminate in knob-like extremities 130 which both have facing convex surfaces that terminate in outwardly directed fingers 132 at the mouth of the gap 38.

The frame 26 also has a resilient catch 40 on its upper surface which is formed with a transverse cantilevered leg that angles inwardly to terminate in a knob-like bulb at its extremity. The follower 124, the cantilevered arms 34 and 36, the catch 40 and the ribs 28, 30 and 32 are all integrally formed with the frame 26 as a single unitary molded plastic structure.

A unitary plastic bolt 42 is illustrated in FIG. 4 and has a lug 44 at one end and a lug 46 at the other. The lugs 44 and 46 of the bolt 42 are each defined with outer curved surfaces disposed in opposite directions of rotation. The lugs 44 and 46 are defined with abutting ledges extending generally radially inwardly from the outer curved surfaces. These ledges are designed to register in abutting contact with inwardly projecting teeth 56 of the latching ring 54.

The bolt 42 is designed with upright parallel walls 106 and 108. The lower edge of the outer surface of the wall 106 moves in sliding contact with the co-linear ribs 30 and 32 of the frame 26. The upper edge of the outer surface of the wall 106 moves in sliding contact with the parallel metal rib 33 on the underside of the bonnet 22, visible in FIG. 3. Similarly, the lower edge of the outer surface of the wall 108 moves in sliding contact with the parallel rib 28 of the frame 26, visible in FIG. 4. The upper edge of the outer surface of the wall 108 moves in sliding contact with the metal rib 35 on the underside of the bonnet 22. The bolt 42 also has two concave detents 48 and 50 along the undersurface of the wall 106, visible in FIG. 6. The detents 48 and 50 are engageable with the catch 40 on the frame 26 to hold the bolt 42 at selected unlocking and locking dispositions relative to the frame 26, illustrated in FIGS. 4 and 9 respectively.

The parallel walls 106 and 108 of the bolt 42 are joined together by a flat floor 112 into which there are defined a pair of rectangular openings 114 and 116, of unequal length, both parallel to each other and to the walls 106 and 108. The rectangular apertures 114 and 116 are designed to accommodate downwardly projecting crank pins 118 and 120 that depend from a lock cylinder 58.

At one end of the bolt 42 the rectangular apertures 114 and 116 terminate directly above a wedge-shaped stud 52. The wedged-shaped stud 52 projects downwardly from the underside of the flat floor 112. The stud 52 has vertical flat wall surfaces 110 that converge to an apex which is directed toward the center of the gap 38 between the cantilevered arms 34 and 36 toward the bases 126 and 128 thereof, as depicted in FIG. 6.

A unitary annular latching ring 54 is mounted in the outer race 20 of the core 12 and is coupled to the core 12 in torque limiting fashion as illustrated in FIG. 5. The annular latching ring 54 has three radially inwardly directed teeth 56 which are engageable with the lugs 44 and 46 of the bolt 42 as illustrated in FIGS. 4 and 9 respectively. The interiorally directed teeth 56 of the latching ring 54 are formed with surfaces which engage the lugs 44 and 46 of the bolt 42 in abutting fashion. The tips of the teeth 56 are constructed with inclined surfaces at their interiorally directed extremities and converge to a point.

The annular latching ring 54 also has three much smaller radially outwardly directed projections 98, each with a radially directed surface 100 and a camming surface 102, visible in FIGS. 4 and 5. These projections 98 interact with the inwardly directed teeth 92 of the core 12 in the outer race 20 as will hereinafter be described.

The latching rings 54 include three spaced arcuate slots 104 defined therein interiorally of the outer periphery of the latching ring surface. The undersurface of the inner periphery of the latching ring 54 is beveled to ride in contact with the beveled surface 86 of the lip 16 so as to maintain the latching ring 54 in concentric arrangement within the core 12.

Figure 2:
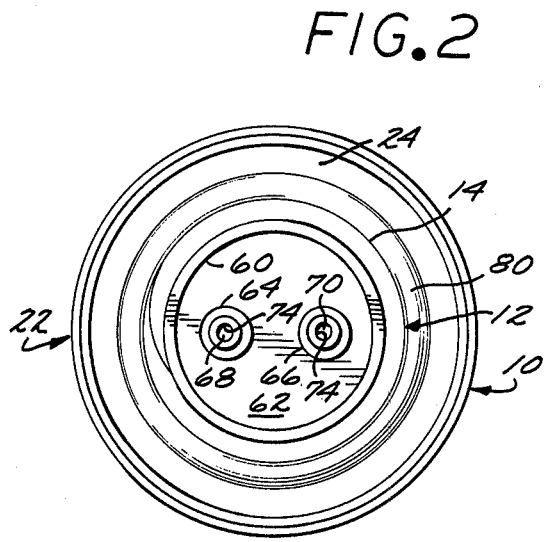
FIG. 2 is a bottom plan view of the tank cap of FIG. 1.

The bonnet 22 is constructed of aluminum and is depicted in detail in FIGS. 1 and 2. The bonnet 22 includes longitudinal knurled ribs 136 on its outer surface. Across the diameter of the bonnet 22 on its outer exposed surface there is a raised bridge 138 within the center of which a lock mechanism 58 is confined. Parallel ribs 33 and 35 are defined in the undersurface of the bonnet 22 which, together with the ribs 28, 30 and 32, on the frame 26 define the track which guides the bolt 42 in reciprocating movement.

The lock mechanism mounted in the bonnet 22 is visible in FIGS. 1 and 3. The lock mechanism 58 is employed for shifting the bolt 42 to the unlocking position of FIG. 9. The lock mechanism may be a key actuated device as depicted, a magnetically actuated lock as illustrated in U.S. Pat. No. 4,132,091, or a lock mechanism with some other type of actuating movement. The lock mechanism 58 is entrapped within the cylindrical portion of the bridge 138 by an outwardly biased spring loaded tang 140. When the proper key is inserted in the lock mechanism 58, the lock cylinder is free to rotate so that the cylindrical lock crank pins 118 and 120, depending downwardly from the cylinder, move in circular paths about the axial center of the cap 10.

With the lock cylinder momentarily actuated by unlocking with a key, the bonnet 22 can be turned counterclockwise to disengage the threads 14 of the core 12 from a threaded fuel tank inlet pipe. However, counter-rotation of the bonnet 22 will shift the bolt 42 to a locking position, so that subsequent counterclockwise rotation of the bonnet 22 will not further disengage the core 12, but instead the bonnet 22 will rotate freely counterclockwise relative to the core 12 as depicted in FIG. 7.

The operation of the fuel tank cap 10 is best illustrated with reference to FIGS. 4-10.

To unlock the fuel tank cap 10 a key is inserted into the locking mechanism 58 and rotated counterclockwise as viewed in FIGS. 1 and 9. With the insertion of the proper key the locking mechanism tumblers are freed and the lock cylinder can be rotated counterclockwise within the bonnet 22. The crank pins 118 and 120 are likewise rotated counterclockwise as viewed in FIG. 9. The crank pin 118 bears against the end of the rectangular aperture 114 in the bolt 42 to push the bolt 42 toward the unlocking position as viewed in FIG. 9. The lug 46 bears against one of the teeth 56 of the annular latching ring 54. Counterclockwise rotation of the bonnet 22, as indicated in FIG. 9, causes the ribs 33 and 35 on the inside of the bonnet 22 to carry the bolt 42 in rotation in a counterclockwise direction as viewed in FIG. 9. With the bolt 42 in the unlocking position depicted in FIG. 9, the wedge-shaped stud 52 is driven toward the bases 126 and 128 of the cantilevered arms 34 and 36 and further into the gap 38 defined therebetween, as depicted in FIG. 10. With the advance of the wedge-shaped stud 52, the arms 34 and 36 are biased further apart from the positions they assume when the bolt 42 is in the locking disposition as viewed, for example, in FIGS. 6 and 8. Since the legs 34 and 36 are resiliently deformed, they tend to spring bias the wedge-shaped stud 52 backward away from the bases 126 and 128 to return the bolt toward a locking disposition. However, the bolt 42 is restrained from such movement by the action of the catch 40 which lodges in the detent 50, as illustrated in FIG. 10.

Continued counterclockwise rotation of the bonnet 22 rotates the bolt 42. The lug 46 of the bolt 42 bears against the tooth 56 as indicated in FIG. 9, thereby turning the latching ring 54. The latching ring 54 carries the core 12 in rotation by the interaction of the outwardly directed projections 98 of the latching ring with the bearing surfaces 94 of the teeth 92 of the core 12 in the outer race 20 as illustrated. The threads 14 can thereby be totally disengaged from the fuel tank inlet pipe.

When it is desired to replace the fuel tank cap 10 on the fuel tank inlet, the key is rotated clockwise a quarter turn, as viewed in FIG. 1, so that it may be removed from the locking mechanism 58. With the removal of the key, the bonnet 22 is turned clockwise. The ribs 33 and 35 of the inside of the bonnet 22 carry the bolt 42 in clockwise rotation until the curved back surface of the lug 46 strikes one of the teeth 56 on the latching ring 54. The interaction of the point of the tooth 56 on the latching ring 54 with the curved surface of the lug 46 pushes the bolt and dislodges the catch 40 from the detent 50 so that the bolt 42 moves from the position of FIG. 10 to the position of FIG. 4. In this position the catch 40 is lodged in the detent 48. Continued clockwise rotation of the bonnet 22 carries the bolt 42 still further in rotation until the lug 44 resides in abutment with the next subsequent tooth 56 on the latching ring 54 as depicted in FIG. 4.

The bolt 42 thereby moves from the position of FIG. 9 to the position of FIG. 4, although until the lug 44 engages a tooth 56 as depicted in FIG. 4 the rotation of the bonnet 22 is not accompanied by the rotation of the core 12. During this time the frame 26 turns in rotation with the bolt 42, and the follower 124 ratchets freely on the corrugated surface 84 of the inner race 18. This provides an audible indication to the user that the bonnet 22 is disengaged from the core 12. This indication is perfectly normal at the time that direction of rotation of the bonnet 22 is changed, but is an indication of a malfunction if it persists.

Once the bolt 42 has been rotated clockwise with the bonnet 22 so that the lug 44 bears against the tooth 56 of the latching ring 54, as depicted in FIG. 4, the interengagement of the bolt 42 with the latching ring 54 will rotate the core 12 clockwise as viewed in FIG. 4. This rotation will continue, thereby threadably engaging the threads 14 of the core 12 with the corresponding internal threads of the inlet pipe to the fuel tank.

The invention is preferably provided with a torque limiting mechanism which prevents overtightening of the cap 10 on the fuel inlet pipe. Once the threads 14 of the core 12 have been fully engaged with the corresponding threads of the tank filler inlet pipe, there is considerable resistance to further turning of the core 12. The projections 98 of the annular latching ring 54 are formed of plastic, and are sufficiently resilient to coact with the radially inwardly directed plastic teeth 92 on the outer race 20 of the core 12 so that the points of the teeth 92 slide along the camming surfaces 102 of the projections 98, thereby allowing the latching ring 54 to turn with the bonnet 22 while the core 12 ceases rotation.

Once the bonnet 22 has been turned clockwise sufficiently to move the bolt 42 along the tracks defined in the mechanism from the unlocking position of FIG. 9 to the locking position of FIG. 4, counter-rotation of the bonnet 22 will no longer disengage the threads 14 from the fuel tank inlet pipe. Rather, the movement of the bolt 42 to the locking position will disengage the bolt 42 from the core 12 should an individual attempt to unlock the cap 10. This is illustrated in FIG. 7 in which the bonnet 22 is rotated counter-clockwise after the lug 46 has already been cammed to disengage the catch 40 from the detent 50, and re-engage it in the detent 48, as depicted in FIG. 8. Counterclockwise of the bonnet 22 will rotate the bolt 42, but the lug 46 will pass radially inwardly from the teeth 56 and will not engage those teeth. Periodically the teeth 56 will strike the curved back surface of the lug 44, but this only serves to cam the bolt slightly toward the center of the core 12 to a degree insufficient to dislodge the catch from the detent 48. Once the curved backside of the lug 44 is rotated past the tooth 56, the spring bias of the cantilevered legs 34 and 36 thrusts the bolt 42 back to its prior position, so that any clockwise rotation of the bonnet 22 will bring the generally radial surface of the lug 44 into abutment with one of the teeth 56.

In manipulating the fuel tank cap 10 of the invention, clockwise rotation of the bonnet 22 will rotate the core 12 in the same direction by virtue of the interaction of the lug 44 with one of the teeth 56 of the latching ring 54, as depicted in FIG. 4. The core 12 will remain engaged with the bonnet 22 until such time as the threads 14 are fully tightened and the core 12 resists further clockwise rotation. When this occurs, it is possible to continue to rotate the bonnet 22, but the teeth 92 will ratchet across the inclined surfaces 102 of the projections 98 on the latching ring 54. By unlocking the cap 10 of the invention with a key, the crank pin 118 forces the bolt 42 to the unlocking position depicted in FIG. 9. With counterclockwise rotation of the bonnet 22, the lug 46 will engage a tooth 56 of the latching ring 54 and turn the core 12 counter-clockwise also. The cap 10 can be completely removed from engagement with a fuel tank inlet when rotated in this fashion. There is no mechanism for limiting torque in this direction.

The bolt 42 will resume its locked position when the bonnet 22 is rotated clockwise, whereupon the bolt 42 is forced from the unlocking position of FIG. 9 to the locking position of FIGS. 4 and 7. If the bonnet 22 is thereafter turned counterclockwise, the lug 46 will not engage the teeth 56 of the latching ring 54, and the teeth 56 will cam past the lug 44 so that the bonnet 22 turns freely about the core 12.

Various alternative forms of the invention will undoubtedly become apparent to those familiar with self-locking fuel tank caps. Accordingly, the scope of the invention should not be limited to the specific embodiment disclosed herein, but rather is defined in the claims appended hereto.

I claim:

1. A locking fuel tank cap comprising:
   an externally threaded plastic core having a radial sealing lip and defining an inner annular race,
   a bonnet which affords an external hand grip and which is coupled to said core for relative rotation thereto,
   a unitary plastic frame mounted for rotation in said inner race having a resilient catch and a pair of resilient, transverse, cantilevered arms defining a gap therebetween that extends through the axial center of said inner race, and having,
   a unitary plastic bolt having lugs at both ends, each one of which is engageable in an opposite direction of rotation, and said bolt has at least two detents for alternatively engaging said catch to hold said bolt in selected unlocking and locking dispositions of movement along said gap, and said bolt includes a stud which projects into said gap between said arms, whereby said arms spring bias said bolt toward said locking position,
   a track for guiding said bolt for movement relative to said bonnet and said frame,
   a unitary plastic latching ring coupled to said core for rotation therewith and having at least one radially inwardly directed tooth for engagement with said lugs of said bolt, and
   a lock mechanism for shifting said bolt to an unlocking disposition in which said tooth is engaged with one of said lugs to rotate said core in a disengaging direction, and in which counter-rotation of said bonnet shifts said bolt to a locking disposition.

2. A locking fuel tank cap according to claim 1 further characterized in that said arms have bases and diverge to cantilevered extremities and said gap is narrow between said bases and widens at the cantilevered extremities of said arms and said stud is of wedge-shaped configuration with an apex directed toward the narrow end of said gap.

3. A locking fuel tank cap according to claim 2 further characterized in that said catch is a knob held on a cantilevered support.

4. A locking fuel tank cap according to claim 2 further characterized in that said track is formed by a plurality of parallel ribs on the upper side of said frame and by corresponding parallel ribs on the inside of said bonnet.

5. A locking fuel tank cap according to claim 2 further characterized in that said inner race includes a wall with an annular corrugated surface, and said frame includes a follower that ratchets across said corrugated surface as said frame rotates relative to said inner race.

6. A locking fuel tank cap comprising:

a hollow central unitary plastic core externally threaded at one end for mating engagement with a corresponding internally threaded fuel tank inlet pipe, and having a radially outwardly directed circumferential sealing lip at the other end, and said core defines a central axial recess with inner and outer annular transversely disposed races located within said lip, a bonnet for providing a hand grip and positioned to coaxially encircle said sealing lip of said central core, means for securing said bonnet against axial movement relative to said core, a unitary transverse plastic frame rotatably supported by said inner race and including a resilient detent catch, a pair of smooth, elastically resilient transverse cantilevered arms joined at proximately located bases on said frame and extending radially inwardly from said frame to define a narrow gap therebetween which widens to a mouth at the cantilevered extremities thereof, a unitary plastic bolt reciprocally movable relative to said frame along said gap and having diametrically opposite lugs facing in opposite clockwise and counterclockwise directions, and having a stud depending into said gap between said cantilevered arms, and a plurality of recesses that receive said detent catch when said bolt is moved along said track, whereby said stud forces said cantilevered arms apart when moved toward said bases thereof, and the countervailing elasticity of said arms tends to force said guide stud toward said mouth, thereby pushing said bolt away from said bases of said arms, and said detent catch coacts with said recesses in said bolt to resist the force of said arms, a transverse track to restrict movement of said bolt to a longitudinal path along said gap, a locking mechanism actuable for moving said bolt along said track, and a latching ring mounted in said outer race and having at least one radially inwardly directed tooth which is engagable by opposite ones of said lugs of said bolt moving in opposite directions of rotation, and said latching ring is engageable with said core in torque limiting fashion when rotated in a direction to tighten said core onto said fuel tank inlet pipe.

7. A locking fuel tank cap according to claim 6 further characterized in that a lubricating grease is applied to said inner and outer races.

8. A locking fuel tank cap according to claim 6 further characterized in that said cantilevered extremities of said arms are configured to define convex surfaces, and said stud is of wedge-shaped configuration with an apex directed along the center of said gap toward said bases of said arms.

* * * * *

Disclaimer 4,299,102.—*Ernesto Aro*, Torrance, Calif. LOCKING FUEL CAP WITH PLASTIC MECHANISM. Patent dated Nov. 10, 1981. Disclaimer filed Mar. 29, 1989, by the assignee, Mr. Gasket Co.

Hereby enters this disclaimer to the entire term of said patent.
[ *Official Gazette June* 6, 1989 ]